United States Patent
Sigamani

(10) Patent No.: US 11,121,633 B2
(45) Date of Patent: Sep. 14, 2021

(54) LOW COMMON MODE NOISE TRANSFORMERS AND SWITCH-MODE DC-DC POWER CONVERTERS

(71) Applicant: Astec International Limited, Kowloon (HK)

(72) Inventor: James Sigamani, Pasig (PH)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 16/689,786

(22) Filed: Nov. 20, 2019

(65) Prior Publication Data

US 2020/0287467 A1    Sep. 10, 2020

Related U.S. Application Data

(62) Division of application No. 16/293,231, filed on Mar. 5, 2019, now Pat. No. 10,742,123.

(51) Int. Cl.
| | |
|---|---|
| *H02M 3/335* | (2006.01) |
| *H01F 27/28* | (2006.01) |
| *H02M 1/08* | (2006.01) |
| *H01F 27/24* | (2006.01) |
| *H01F 27/32* | (2006.01) |
| *H02M 1/00* | (2006.01) |

(52) U.S. Cl.
CPC .... *H02M 3/33569* (2013.01); *H01F 27/2804* (2013.01); *H02M 1/08* (2013.01); *H01F 27/24* (2013.01); *H01F 27/324* (2013.01); *H02M 1/0074* (2021.05)

(58) Field of Classification Search
CPC ..... H02M 2001/0074; H02M 3/33569; H02M 1/08; H01F 27/324; H01F 7/2804; H01F 27/24
See application file for complete search history.

(56) References Cited

U.S. PATENT DOCUMENTS

| | | |
|---|---|---|
| 5,684,445 A | 11/1997 | Kobayashi et al. |
| 6,388,898 B1 | 5/2002 | Fan et al. |
| 8,779,882 B2 | 7/2014 | Phadke |
| 10,742,123 B1 * | 8/2020 | Sigamani ............... H02M 1/08 |
| 2002/0130753 A1 | 9/2002 | Merriam et al. |
| 2006/0038650 A1 | 2/2006 | Mehrotra et al. |
| 2011/0074533 A1 | 3/2011 | Phadke |
| 2014/0016370 A1 | 1/2014 | Chandrasekaran |
| 2015/0326141 A1 | 11/2015 | Takahashi et al. |

(Continued)

*Primary Examiner* — Harry R Behm

(57) ABSTRACT

A switch-mode DC-DC power converter includes one or more input terminals and output terminals, and a transformer coupled between the input and output terminals. The transformer includes a plurality of winding sets. Each winding set includes a primary winding and a secondary winding magnetically coupled with one another. The primary winding and the secondary winding include the same number of turns. The primary windings of the plurality of winding sets are connected in series and the secondary windings of the plurality of winding sets are connected in parallel. The power converter also includes at least one spacer positioned to separate an adjacent pair of the plurality of winding sets. A magnetic coupling between the adjacent pair of the plurality of winding sets is less than the magnetic coupling between the primary winding and the secondary winding within each winding set.

6 Claims, 6 Drawing Sheets

(56) References Cited

U.S. PATENT DOCUMENTS

| | | |
|---|---|---|
| 2016/0294294 A1 | 10/2016 | Ye et al. |
| 2017/0155332 A1* | 6/2017 | Sigamani ................ H01F 38/00 |
| 2018/0226182 A1 | 8/2018 | Fe et al. |
| 2019/0043661 A1* | 2/2019 | Jin ...................... H01F 27/2804 |

\* cited by examiner

LOW COMMON MODE NOISE TRANSFORMERS AND SWITCH-MODE DC-DC POWER CONVERTERS

CROSS-REFERENCE TO RELATED APPLICATION

This application is a divisional of U.S. patent application Ser. No. 16/293,231 filed Mar. 5, 2019. The entire disclosure of the above application is incorporated herein by reference.

FIELD

The present disclosure relates to low common mode noise transformers and switch-mode DC-DC power converters.

BACKGROUND

This section provides background information related to the present disclosure which is not necessarily prior art.

Growing power demands for cloud computing, data centers, etc. are requiring power supplies with increased power efficiency and increased power density. Power efficiency is commonly limited by magnetic core losses due to proximity and eddy current in copper wires at high frequency. In addition, common mode noise is increased at high frequency due to a higher change in voltage over time in transformer windings.

SUMMARY

This section provides a general summary of the disclosure, and is not a comprehensive disclosure of its full scope or all of its features.

According to one aspect of the present disclosure, a switch-mode DC-DC power converter includes one or more input terminals for receiving an input voltage from a voltage source, one or more output terminals for supplying an output voltage to a load, and a transformer coupled between the input and output terminals. The transformer includes a plurality of winding sets. Each winding set includes a primary winding and a secondary winding magnetically coupled with one another. The primary winding and the secondary winding include the same number of turns. The primary windings of the plurality of winding sets are connected in series and the secondary windings of the plurality of winding sets are connected in parallel. The power converter also includes at least one spacer positioned to separate an adjacent pair of the plurality of winding sets. A magnetic coupling between the adjacent pair of the plurality of winding sets is less than the magnetic coupling between the primary winding and the secondary winding within each winding set.

According to another aspect of the present disclosure, an interleaved LLC power converter one or more input terminals for receiving an input voltage from a voltage source, one or more output terminals for supplying an output voltage to a load, and a first LLC converter. The first LLC converter includes a first transformer and a first spacer. The first transformer is coupled between the input and output terminals, and includes a first plurality of winding sets each including a primary winding and a secondary winding magnetically coupled with one another. The first spacer is positioned to separate an adjacent pair of the first plurality of winding sets. The primary windings of the first plurality of winding sets are connected in series and the secondary windings of the first plurality of winding sets are connected in parallel. The power converter also includes a second LLC converter interleaved with the first LLC converter. The second LLC converter includes a second transformer and a second spacer. The second transformer is coupled between the input and output terminals, and includes a second plurality of winding sets each including a primary winding and a secondary winding magnetically coupled with one another. The second spacer is positioned to separate an adjacent pair of the second plurality of winding sets. The primary windings of the second plurality of winding sets are connected in series and the secondary windings of the second plurality of winding sets are connected in parallel.

According to yet another aspect of the present disclosure, a transformer includes at least one core, and a plurality of winding sets wound about the at least one core. Each winding set includes a primary winding and a secondary winding magnetically coupled with one another. The primary winding and the secondary winding include the same number of turns. The primary windings of the plurality of winding sets are connected in series and the secondary windings of the plurality of winding sets are connected in parallel to define a step-down turns ratio of the transformer, or the primary windings of the plurality of winding sets are connected in parallel and the secondary windings of the plurality of winding sets are connected in series to define a step-up turns ratio of the transformer. The transformer also includes at least one spacer positioned to separate an adjacent pair of the plurality of winding sets, and a plurality of rectifiers. A magnetic coupling between the adjacent pair of the plurality of winding sets is less than the magnetic coupling between the primary winding and the secondary winding within each winding set.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
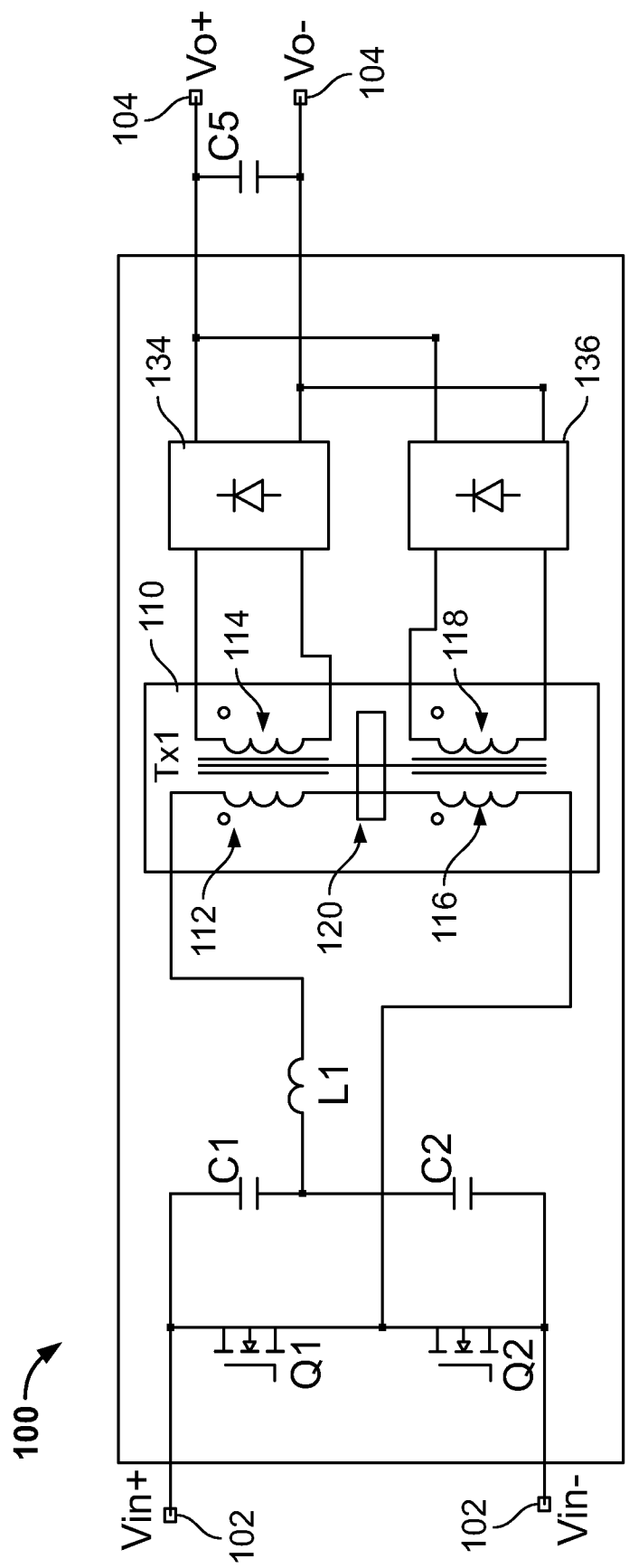
FIG. 1 is a circuit diagram of a switch-mode DC-DC power converter, according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A switch-mode DC-DC power converter according to one example embodiment is illustrated in FIG. 1 and indicated generally by reference 100. The power converter 100 includes input terminal(s) 102 for receiving an input voltage from a voltage source, and output terminal(s) 104 for supplying an output voltage to a load.

The power converter 100 also includes a transformer 110 coupled between the input and output terminals 102 and 104. The transformer 110 includes two winding sets. The first winding set includes a primary winding 112 and a secondary winding 114, and the second winding set includes a primary winding 116 and a secondary winding 118.

The primary winding 112 is magnetically coupled with the secondary winding 114 (e.g., via a tight coupling, etc.). The primary winding 112 and the secondary winding 114 may have the same number of turns. Similarly, the primary winding 116 is magnetically coupled with the secondary winding 118 (e.g., via a tight coupling, etc.). The primary winding 116 and the secondary winding 118 may have the same number of turns.

The power converter 100 also includes a spacer 120 positioned to separate the plurality of winding sets, which are adjacent one another. Due to the position of the spacer 120, magnetic coupling between the adjacent pair of the plurality of winding sets (e.g., a loose coupling, etc.) is less than the magnetic coupling between the primary winding and the secondary winding within each winding set (e.g., a tight coupling, etc.).

The primary windings 112 and 116 are connected in series, and the secondary windings 114 and 118 are connected in parallel. For example, the power converter 100 includes optional rectifiers 134 and 136, and the secondary windings 114 and 118 are connected in parallel via the optional rectifiers 134 and 136.

Figure 2:
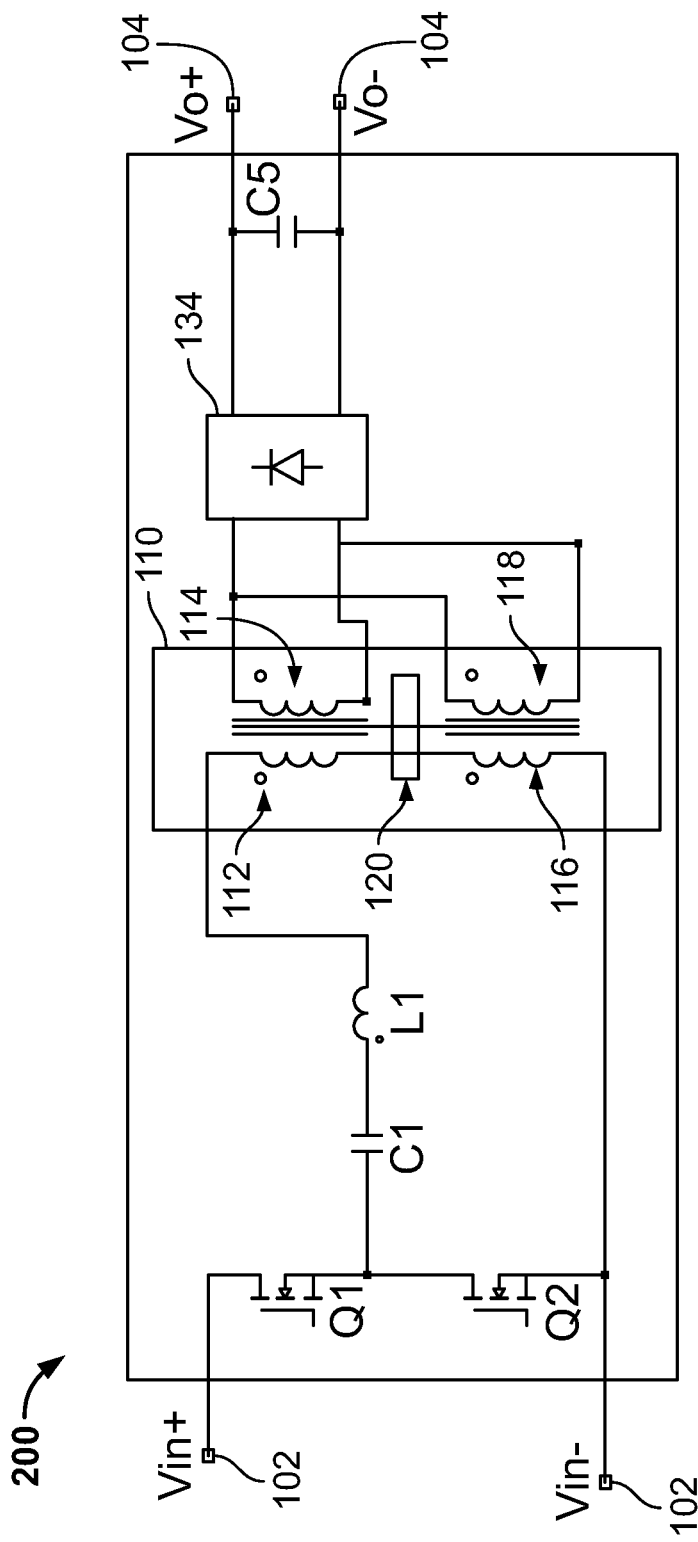
FIG. 2 is a circuit diagram of a switch-mode DC-DC power converter, according to another example embodiment of the present disclosure

Specifically, the optional rectifier 134 is coupled between the secondary winding 114 and the output terminals 104, and the rectifier 136 is coupled between the secondary winding 118 and the output terminals 104. Outputs of the rectifiers 134 and 136 are connected in parallel. In other embodiments, the secondary windings 114 and 118 may be connected in parallel directly (e.g., as illustrated in FIG. 2 and described below).

The power converter 100 reduces (e.g., minimizes) common mode noise due to parasitic capacitance between the primary windings 112 and 116 and the secondary windings 114 and 118, while providing high power efficiency at high switching frequencies.

For example, as mentioned above the primary windings 112 and 116 may each have the same number of turns as their corresponding secondary windings 114 and 118. Each primary winding 112 and 116 is tightly coupled (e.g., magnetically) with its corresponding secondary winding 114 and 118, while the spacer 120 separates the adjacent sets of windings to create loose coupling (e.g., magnetically) between the adjacent sets of windings.

If the number of turns of each primary winding 112 and 116 is the same as its corresponding secondary winding 114 and 118, a voltage change over time (dV/dt) of each winding may be matched to reduce (e.g., minimize) common mode current due to parasitic capacitance between the corresponding primary and secondary winding. Tightly coupled primary and secondary windings with a turns ratio of 1:1 may lower AC resistance of each set of windings while the other set of windings is separated by the spacer 120.

As illustrated in FIG. 1, the power converter 100 includes two switches Q1 and Q2, two capacitors C1 and C2, and an inductor L1. Although FIG. 1 illustrates two capacitors C1 and C2, other embodiments may include only one capacitor on the primary side (e.g., as illustrated in FIG. 2 and described below), more than two capacitors on the primary side, etc.

The switches Q1 and Q2, the capacitors C1 and C2, and the inductor L1 are coupled between the input terminals 102 and the primary windings 112 and 116. Specifically, the switches Q1 and Q2 are coupled in parallel with the capacitors C1 and C2, and the inductor L1 is coupled between the capacitors C1 and C2 and the primary windings 112 and 116.

If each primary winding 112 and 116 has the same number of turns as its corresponding secondary winding 114 and 118, each set of corresponding primary and secondary windings will have a 1:1 turns ratio. Because the primary windings are connected in series while the secondary windings are connected in parallel via the rectifiers 134 and 136, the power converter 100 will have a 2:1 transformer turns ratio.

In other embodiments, the turns ratio for the power converter 100 may be adjusted by increasing or decreasing the number of sets of windings in the power converter 100, while maintaining the series connection of all primary windings and the parallel connection of all secondary windings via the rectifiers. For example, if a power converter includes four sets of primary and secondary windings, the power converter may have a 4:1 transformer turns ratio. Other embodiments may have a higher or lower turns ratio, such as 1:1, 3:1, 5:1, 8:1, etc.

The input voltage may be set as an integer multiple of a desired output voltage, assuming little or no resistive voltage drops due to windings, primary field-effect transistors (FETs), etc. Specifically, the input voltage (Vin) may be equal to the output voltage (Vo) times a number of sets of windings in the converter.

As an example, for a 48V output, the input voltage may be 48V, 96V, 144V, etc. If a PFC pre-regulator is used (e.g., for variable output voltage applications, etc.), the output voltage for a 230V nominal input may be selected as 384V. Using a half-bridge LLC topology, the input voltage would be 384/2=192V. In that case, a 4:1 transformer turns ratio would provide an output voltage of 48V. As described above, four 1:1 primary and secondary winding sets (e.g., coils) may be used to realize the 4:1 transformer turns ratio by connecting the primary windings of the four sets in series while connecting the secondary windings in parallel.

In order to accommodate resistive drops due to load current, the input voltage may need to be increased, an LLC operating frequency may need to be set lower than the resonant frequency, etc. The required operation frequency adjustment to compensate for the resistive voltage drops may depend on an LLC gain versus frequency characteristics, etc. Although an output voltage of 48V DC is described as an example herein, other embodiments may use any other suitable input or output voltages, such as 12V DC, etc. The power converter includes an optional output capacitor C5 coupled in parallel with the output terminals 104. Other embodiments may include more than one output capacitor, no output capacitor, etc.

The power converter 100 may include one or more controllers for controlling switching operation of the switches Q1 and Q2. For example, the controller may control switching operation of the switches Q1 and Q2 to conduct the input voltage with two half cycles, where all of said windings conduct current for the load (e.g., load related current) during both half cycles. The two half cycles may correspond to positive and negative phases of an AC voltage, etc.

The controller(s) may control switching operation of the switches Q1 and Q2 to operate with any suitable switching frequency, such as a switching frequency above 20 kHz, above 100 kHz, above 400 KHz, about one MHz, etc.

As mentioned above, the power converter 100 may provide high power efficiency while operating at high switching frequencies. For example, the controller(s) may control switching operation of the switches Q1 and Q2 of the LLC converters 106 and 108 to operate with any suitable power efficiency, such as a power efficiency greater than 90%, greater than 95%, in a range between 98% and 99%, etc.

Although FIG. 1 illustrates a specific LLC arrangement of the capacitors and inductors, other embodiments may include LLC converters including more or less capacitors and inductors, inductors and capacitors connected in different LLC circuit arrangements, etc.

For example, FIG. 2 illustrates an example switch-mode power converter 200 including a single capacitor C1 between the input terminals 102 and the primary windings 112 and 116. As shown in FIG. 2, the capacitor C1 and the inductor L1 are series-connected between the primary winding 112 and a node defined between the switches Q1 and Q2.

The power converter 200 includes a single rectifier 134 coupled between the output terminals 104 and the secondary windings 114 and 118. As shown in FIG. 2, the secondary windings 114 and 118 are directly coupled in parallel, prior to the rectifier 134. Therefore, the rectifier 134 is coupled between the output terminals 104 and the parallel-connected secondary windings 114 and 118.

Although FIG. 1 illustrates one rectifier 134 or 136 coupled at an output of each secondary winding 114 and 118, and FIG. 2 illustrates a single rectifier 134, other embodiments may include more or less (or zero) rectifiers, rectifiers positioned in other circuit arrangements, etc.

Referring again to FIG. 1, the switches Q1 and Q2 are illustrated as arranged in a half-bridge circuit, but other embodiments may include LLC converters including more or less switches, switches connected in different circuit arrangements (e.g., full-bridge circuits), etc.

The input terminals 102 and the output terminals 104 may include any suitable connector, terminal, wire, conductive trace, etc. for receiving a power from a voltage source or supplying power to a load. For example, the input terminals 102 may be connected to receive an input voltage from a DC voltage source, from a pre-regulator output, etc. Although FIG. 1 illustrates two input terminals 102 and two output terminals 104, other embodiments may include more or less input and output terminals.

Figure 3:
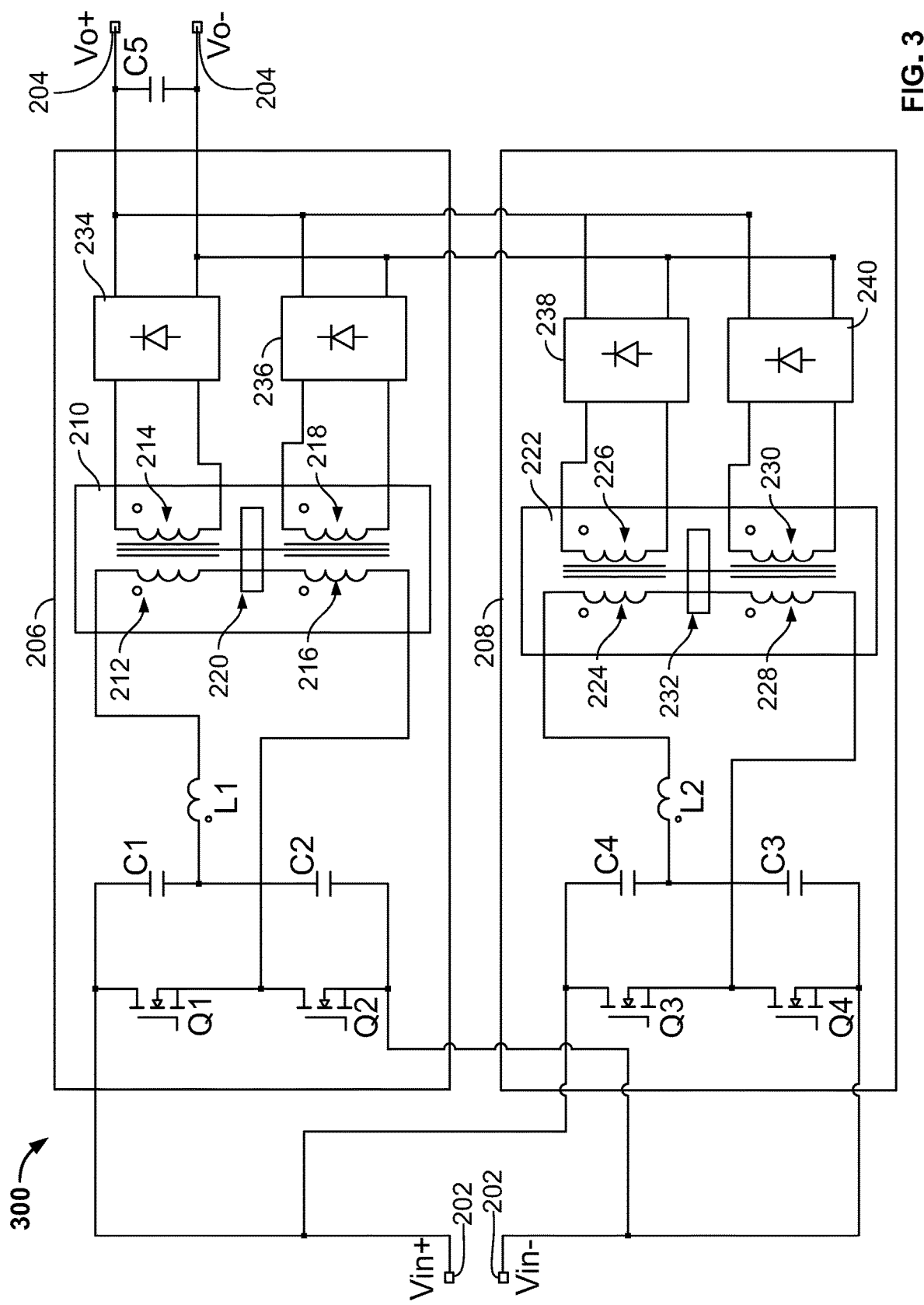
FIG. 3 is a circuit diagram of an interleaved LLC power converter, according to another example embodiment of the present disclosure.

An interleaved LLC power converter according to another example embodiment of the present disclosure is illustrated in FIG. 3 and indicated generally by reference number 300. The power converter 300 includes input terminals 202 for receiving an input voltage from a voltage source, and output terminals 204 for supplying an output voltage to a load.

The power converter 300 also includes an LLC converter 206 coupled to receive the input voltage from the input terminals 202 and supply the output voltage to the output terminals 204. The LLC converter 206 includes a transformer 210. The transformer 210 includes a first winding set including a primary winding 212 and a secondary winding 214, and a second winding set including a primary winding 216 and a secondary winding 218.

As shown in FIG. 3, a spacer 220 is positioned between the first set of windings 212 and 214, and the second set of windings 216 and 218. The primary windings 212 and 216 are coupled in series, and the secondary windings 214 and 218 are coupled in parallel via the rectifiers 234 and 236.

The power converter 300 further includes an LLC converter 208 interleaved with the LLC converter 206 (e.g., the LLC converts 206 and 208 are coupled in parallel with one another between the input terminals 202 and the output terminals 204, etc.). The LLC converter 208 includes a transformer 222. The transformer 222 includes a first winding set including a primary winding 224 and a secondary winding 226, and a second winding set including a primary winding 228 and a secondary winding 230.

As shown in FIG. 3, a spacer 232 is positioned between the first set of windings 224 and 226, and the second set of windings 228 and 230. The primary windings 224 and 228 are coupled in series, and the secondary windings 226 and 230 are coupled in parallel via the rectifiers 238 and 240.

As illustrated in FIG. 3, the LLC converter 206 includes two switches Q1 and Q2, two capacitors C1 and C2, and an inductor L1. The switches Q1 and Q2, the capacitors C1 and C2, and the inductor L1 are coupled between the input terminals 202 and the primary windings 212 and 216. Specifically, the switches Q1 and Q2 are coupled in parallel with the capacitors C1 and C2, and the inductor L1 is coupled between the capacitors C1 and C2 and the primary windings 212 and 216.

The LLC converter 206 also includes a rectifier 234 coupled between the secondary winding 214 and the output terminals 204, and a rectifier 236 coupled between the secondary winding 218 and the output terminals 204. The rectifiers 234 and 236 are coupled in parallel, and may include any suitable rectifier circuit such as a full-bridge rectifier, etc. Although FIG. 3 illustrates two rectifiers 234 and 236, in other embodiments the secondary windings may be connected in a center-tapped transformer circuit arrangement, etc.

The LLC converter 208 includes two switches Q3 and Q4, two capacitors C3 and C4, and an inductor L2. The switches Q3 and Q4, the capacitors C3 and C4, and the inductor L2 are coupled between the input terminals 202 and the primary windings 224 and 228. The switches Q3 and Q4 and coupled in parallel with the capacitors C3 and C4, and the inductor L2 is coupled between the capacitors C3 and C4 and the primary windings 224 and 228.

The LLC converter 208 also includes a rectifier 238 coupled between the secondary winding 226 and the output terminals 204, and a rectifier 240 coupled between the secondary winding 230 and the output terminals 204. The rectifiers 238 and 240 are coupled in parallel, and may include any suitable rectifier circuit such as a full-bridge rectifier, etc. Because the primary windings in each LLC converter 206 and 208 are connected in series while the secondary windings are connected in parallel via the rectifiers, current may be shared among the secondary windings in each LLC converter.

The controller(s) may be configured to control switching operation of the switches Q1-Q4 of the LLC converters 206 and 208 to operate the LLC converters 206 and 208 with a ninety degree phase shift relative to one another.

Although FIG. 3 illustrates two interleaved half-bridge LLC converters 206 and 208 in the power converter 200, other embodiments may include more or less LLC converters, other converter topologies, etc. The LLC converters may be operated with different phase shifts relative to one another, such as ninety degree phase shifts, sixty degree phase shifts, forty-five degree phase shifts, etc. The number and degree of phase shifts may correspond to a number or LLC converters in the power converter 300.

The transformers 110 and 210 are example embodiments, and the power converters 100, 200, 300 described herein may include suitable transformer(s) other than the transformers 110 and 210, including different numbers of cores, different core constructions, different winding patterns, etc.

Figure 4:
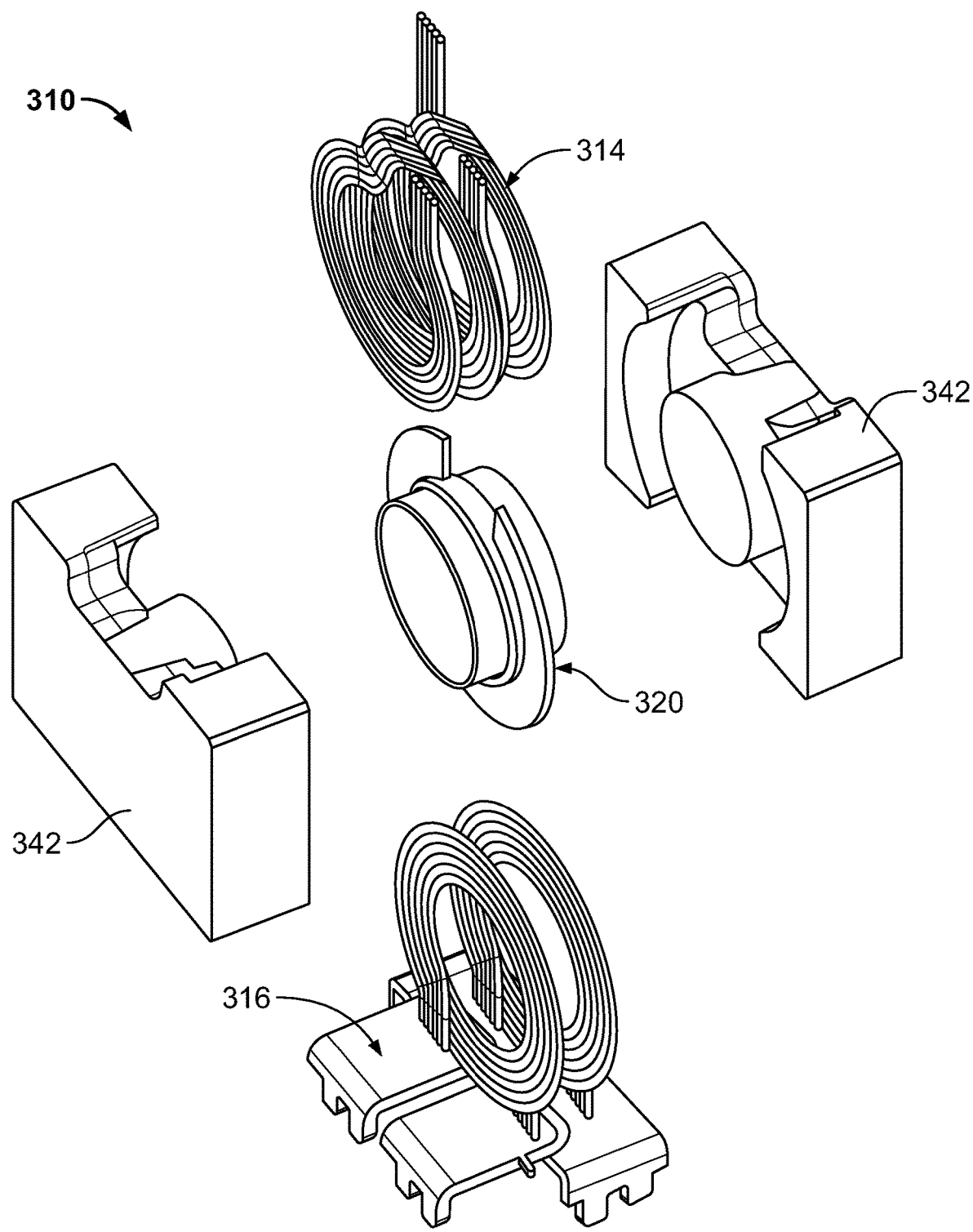
FIG. 4 is an exploded view of a transformer, according to another example embodiment of the present disclosure.

FIG. 4 illustrates an exploded view of a transformer 310 according to another example embodiment of the present disclosure. The transformer 310 includes a core 342. A primary winding 314, a secondary winding 316, and a spacer 320 are positioned about the core 342.

The transformer 310 has a 4:2 turns ratio. The primary winding 314 includes four layers of planar windings, with one turn per layer. The four layers of the primary winding 314 are connected in series for a total of four turns in the primary winding 314. The secondary winding 316 also includes four layers of planar windings, with one turn per layer. Two series connected layers are connected in parallel to define two turns total in the secondary winding 316, for a 4:2 turns ratio (e.g., a 2:1 turns ratio).

The spacer 320 is positioned between two sets of the primary winding 314 and the secondary winding 316, each with a 1:1 ratio including two primary turns and two secondary turns, to create loose coupling (e.g., magnetic coupling) between the two sets. The spacer 320 may include any suitable material for separating the winding layers with loose coupling, such as plastic, FR4 printed circuit board material, etc. The spacer 320 may include a disc, circle, etc. having a same dimension, perimeter, footprint, etc. as each winding.

In some embodiments, multiple transformers each with a 1:1 ratio may be used to achieve a desired turns ratio. For example, four transformers each with a 1:1 turns ratio may be connected with the primary windings in series, and the secondary windings connected in parallel directly or via rectifiers, in order to achieve a 4:1 turns ratio. In other, embodiments, the primary windings could be connected in parallel with the secondary windings connected in series directly or via rectifiers, to define a step-up turns ratio (e.g., a 1:4 step-up turns ratio, etc.).

Figure 5:
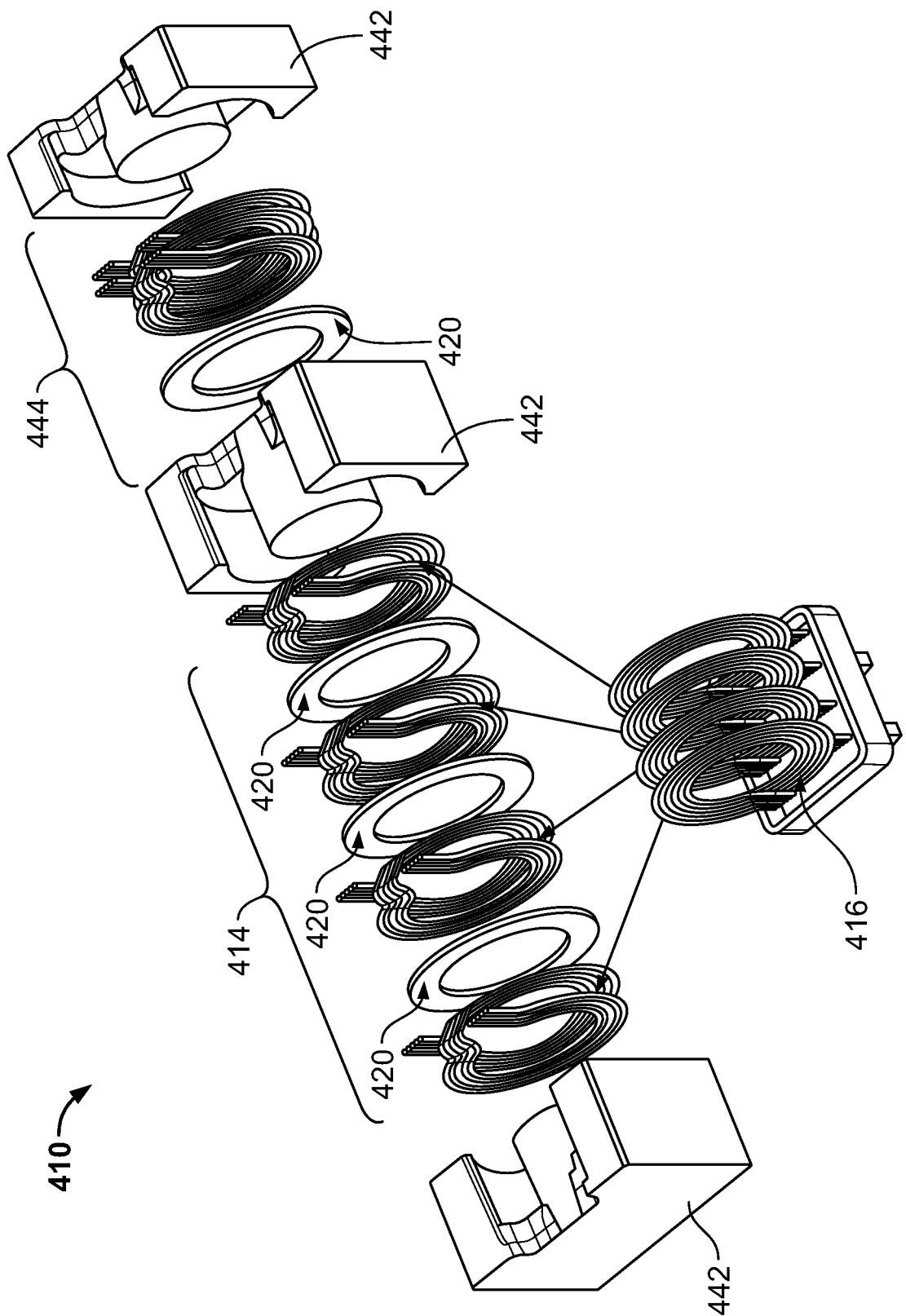
FIG. 5 is an exploded view of a transformer including a resonant inductor coil, according to another example embodiment of the present disclosure.

FIG. 5 illustrates an exploded view of a transformer 410 according to another example embodiment of the present disclosure. The transformer 410 includes a transformer core 442. Primary windings 414, secondary windings 416, and spacers 420 are positioned around the transformer core 442.

Specifically, FIG. 5 illustrates four coils of the primary winding 414 separated from one another by three spacers 420. Each coil of the primary winding 414 includes two turns, and the primary winding coils are connected in series.

The secondary winding 416 includes four coils, with each coil having two turns corresponding to a different one of the four coils of the primary winding 414. The four sets of primary and secondary coils with 1:1 turns ratios having two turns each are separated from one another by the three spacers 420. Each coil of the secondary winding 416 includes two turns, and the secondary winding coils are connected in parallel directly or via rectifiers.

Because the primary winding 414 includes four sets of coils connected in series with two turns per coil, and the secondary winding includes four set of coils connected in parallel with two turns per coil, the transformer 410 has an 8:2 (e.g., 4:1) turns ratio. In general, an N number of winding sets having a 1:1 turns ratio may be connected together to define an N:1 turns ratio.

FIG. 5 illustrates each coil as including two planar turns. In other embodiments, other suitable primary and secondary winding coil arrangements may be used, including more or less coils, more or less turns per coil, more or less spacers 420, non-planar wires, etc.

The transformer 410 also includes an integrated resonant inductor 444. Integrating the resonant inductor 444 in the transformer 410 may improve a volume of the transformer, reduce losses in the transformer 410, etc. For example, an LLC portion of the power converter may have any suitable power density depending on a power level of the power converter, such as at least 100 W per cubic inch, etc.

Figure 6:
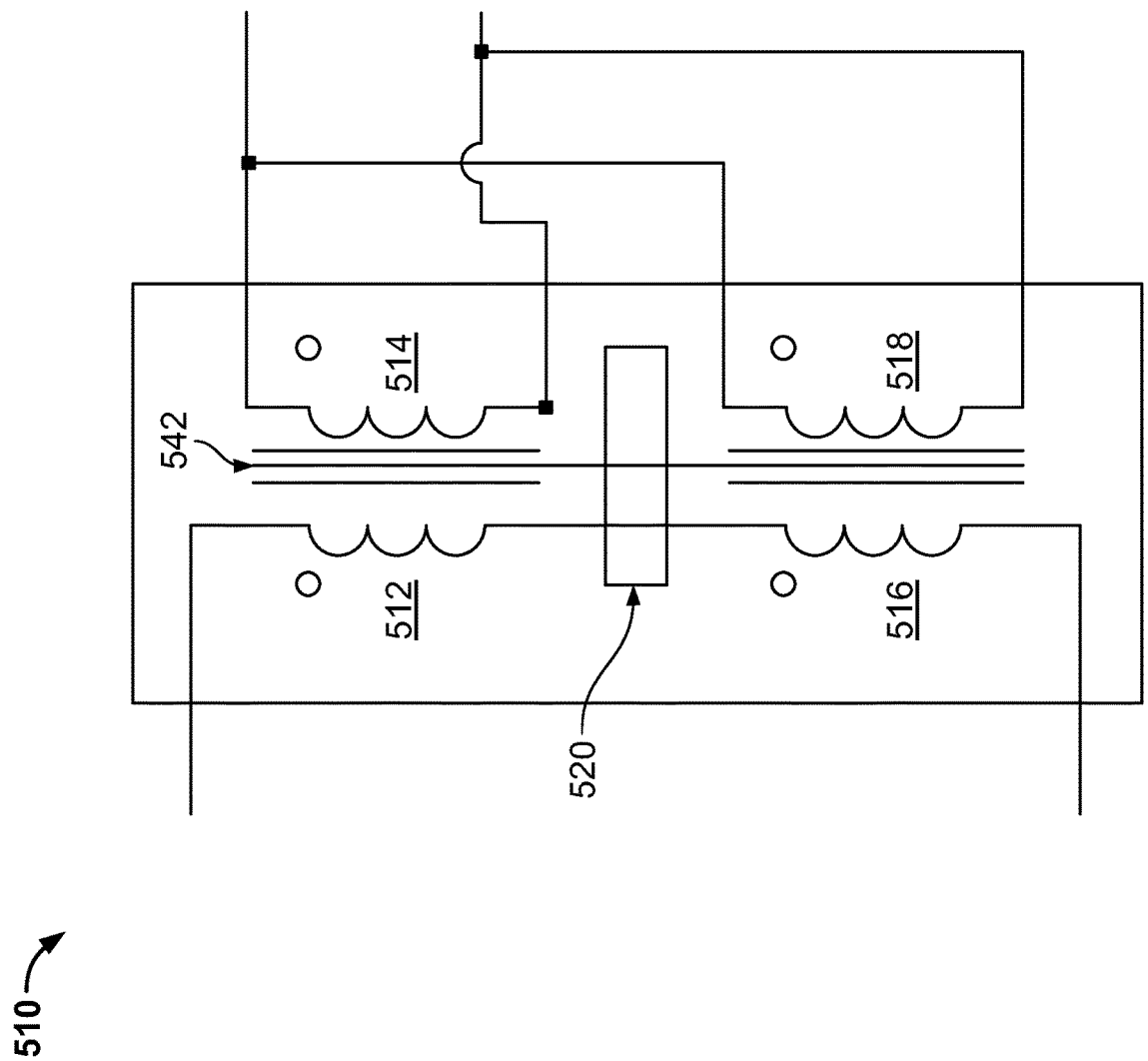
FIG. 6 is a circuit diagram of a transformer, according to another example embodiment of the present disclosure.

FIG. 6 illustrates a transformer 510 according to another example embodiment of the present disclosure. The transformer 510 includes a transformer core 542. The core 542 may include any suitable material, including ferromagnetic material, etc.

A first set of windings includes a primary winding 512 and a secondary winding 514, each wound about the transformer core 542. A second set of windings includes a primary winding 516 and a secondary winding 518, each wound about the transformer core 542.

Although FIG. 6 illustrates a specific winding layout of the primary and secondary windings about the core 542, other embodiments may include any suitable transformer construction, such as a three-phase LLC integrated transformer, etc. The core 542 may include any suitable number of legs, any suitable connection arrangement of the legs, etc.

A spacer 520 is positioned between the first and second sets of windings to separate the first and second sets of windings. Due to the position of the spacer 520, a magnetic coupling between the two sets of windings is less than a magnetic coupling between the primary winding 512 and the secondary winding 514, and less than a magnetic coupling between the primary winding 516 and the secondary winding 518.

As shown in FIG. 5, the primary windings 512 and 516 are coupled in series, and the secondary windings 514 and 518 are coupled in parallel. If the primary windings 512 and 516 have the same number of turns as the secondary windings, the transformer 510 should have a two to one step-down turns ratio.

In other embodiments, the primary windings 512 and 516 may be coupled in parallel, and the secondary windings 514 and 518 may be coupled in series (e.g., directly, via rectifiers, etc.). In that case, if each of the windings has the same number of turns, the transformer 510 should have a one to two step-up turns ratio.

Connecting the primary windings in parallel while connecting the secondary windings in series (e.g., directly, via rectifiers, etc.), may define a step-up turns ratio for power converters used in step-up applications. For example, if the transformer includes eight sets of 1:1 windings with the primary windings coupled in parallel and the secondary rectifiers coupled in series, a 1:8 turns ratio may be defined. If the input voltage is 48V, an output voltage of 384V may be generated with the 1:8 transformer ratio using a full bridge interleaved LLC converter. Using a half-bridge interleaved LLC converter, the same 1:8 turns ratio should provide a 192V output. In general, an N number of winding sets having a 1:1 turns ratio may be connected together to define a 1:N turns ratio for a converter.

In other embodiments, there may be more or less than two sets of windings and the number of turns in each winding may be different, there may be more or less than two sets of windings, so the step-up or step-down turns ratio of the transformer 510 may be varied.

The transformer 510 may be used in any suitable application, such as incorporated in a switch-mode DC-DC power converter (e.g., power converters 100, 200 and 300 described herein, push-pull converters, forward converters, half-bridge converters, full-bridge converters, pulse width modulation (PWM) converters, etc.).

As described herein, the example power converters and controllers may include a microprocessor, microcontroller, integrated circuit, digital signal processor, etc., which may include memory. The power converters and controllers may be configured to perform (e.g., operable to perform, etc.) any of the example processes described herein using any suitable hardware and/or software implementation. For example, the power converters and controllers may execute computer-executable instructions stored in a memory, may include one or more logic gates, control circuitry, etc.

Example embodiments described herein may be used in any suitable power converter application, such as a single rail resonant bus converter, an interleaved resonant bus converter, a fixed frequency resonant bus converter, a buck-fed converter, a boost-fed converter, a buck-boost-fed LLC converter, hyper scale applications, telecommunications applications, open compute project (OCP) power for data centers, servers power supplies, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An interleaved LLC power converter, comprising:
one or more input terminals for receiving an input voltage from a voltage source;
one or more output terminals for supplying an output voltage to a load;
a first LLC converter including a first transformer and a first spacer, the first transformer coupled between the input and output terminals, the first transformer including a first plurality of winding sets each including a primary winding and a secondary winding magnetically coupled with one another, the first spacer positioned to separate an adjacent pair of the first plurality of winding sets, the primary windings of the first plurality of winding sets connected in series and the secondary windings of the first plurality of winding sets connected in parallel; and
a second LLC converter interleaved with the first LLC converter, the second LLC converter including a second transformer and a second spacer, the second transformer coupled between the input and output terminals, the second transformer including a second plurality of winding sets each including a primary winding and a secondary winding magnetically coupled with one another, the second spacer positioned to separate an adjacent pair of the second plurality of winding sets, the primary windings of the second plurality of winding sets connected in series and the secondary windings of the second plurality of winding sets connected in parallel.

2. The power converter of claim 1, wherein each LLC converter includes at least two switches, a capacitor and an inductor, and the switches, capacitor and inductor are coupled between the one or more input terminals and the transformer of said LLC converter.

3. The power converter of claim 2, further comprising a controller for controlling switching operation of the switches of the first and second LLC converters to operate the first and second LLC converters with one of a forty-five degree phase shift, a sixty degree phase shift, and a ninety degree phase shift, relative to one another.

4. The power converter of claim 1, wherein the first and second pluralities of winding sets each comprise exactly two winding sets, and a turns ratio of each LLC converter is two to one.

5. The power converter of claim 1, wherein the first and second pluralities of winding sets each comprise exactly four winding sets, and a turns ratio of each LLC converter is four to one.

6. The power converter of claim 1, wherein each winding comprises a planar winding including one turn per layer.

* * * * *